W. M. WHITNEY.
DRUM SAW MACHINE.
APPLICATION FILED OCT. 27, 1920.
1,386,082.
Patented Aug. 2, 1921.
2 SHEETS—SHEET 1.
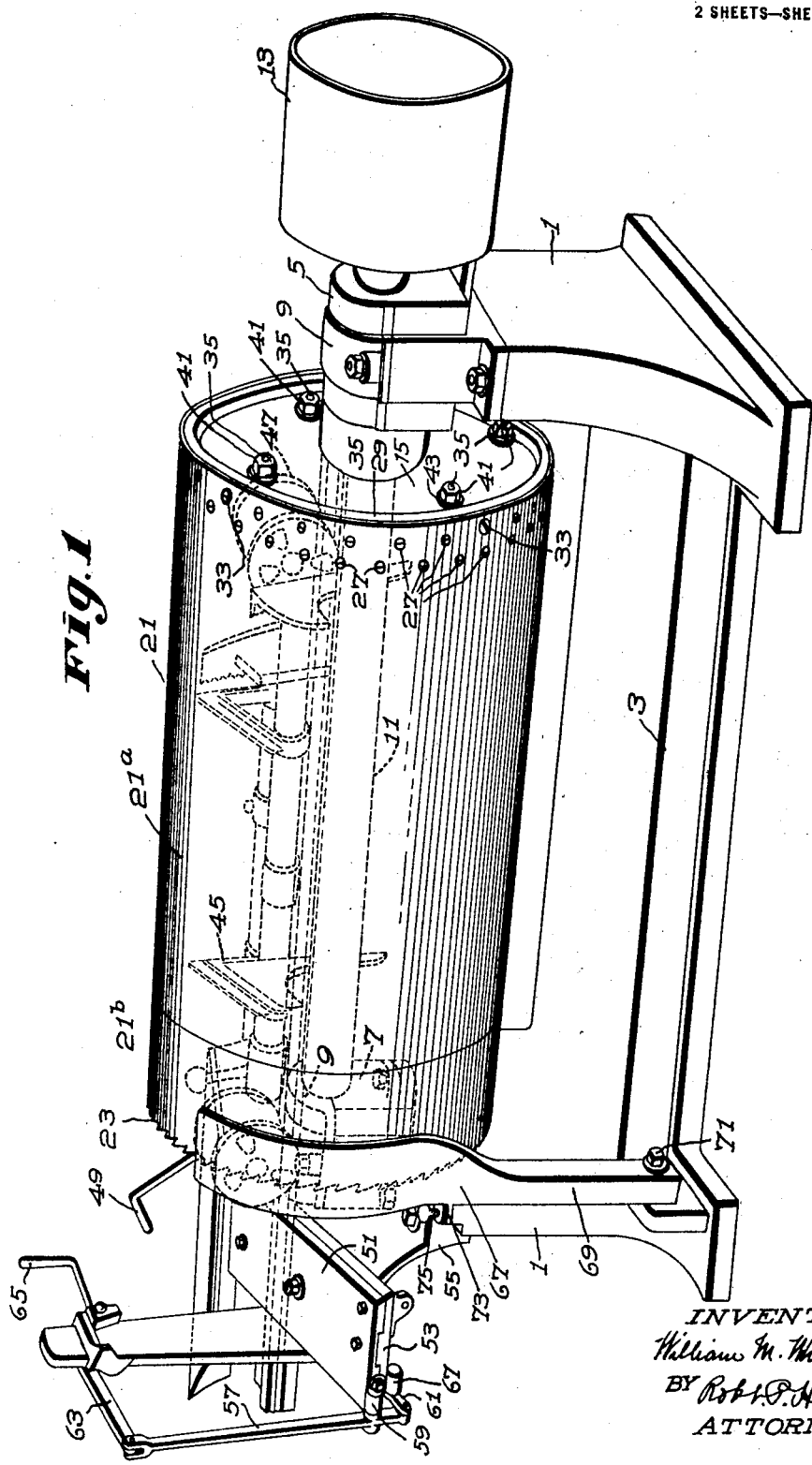
INVENTOR:
William M. Whitney
BY Rob't P. Harris.
ATTORNEY

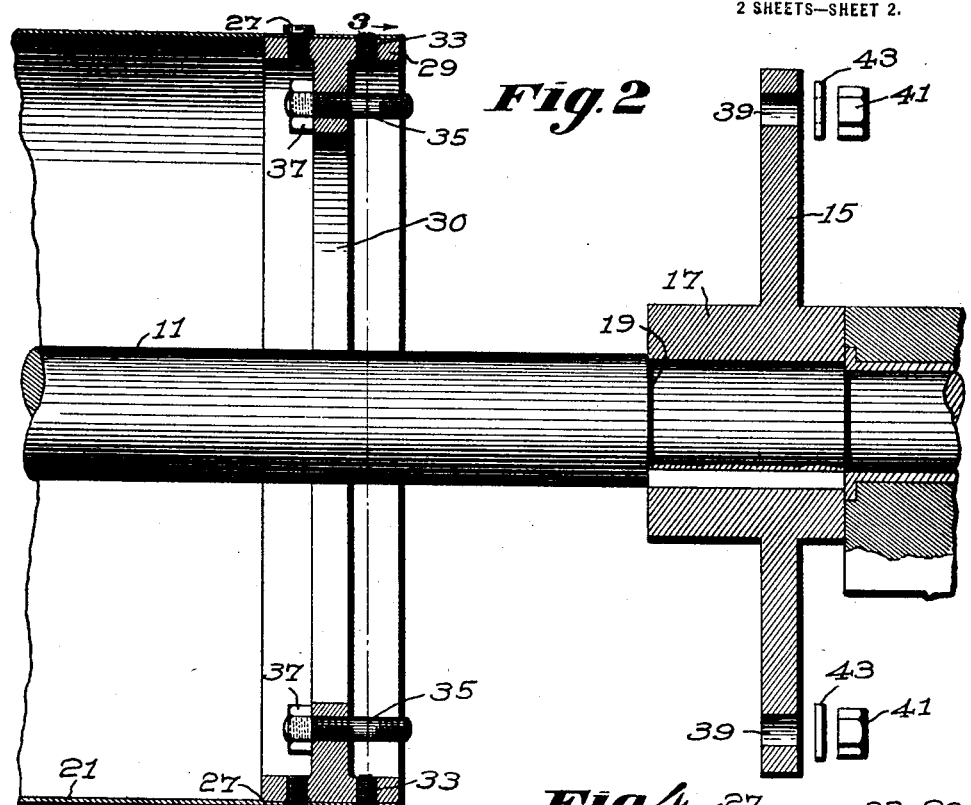
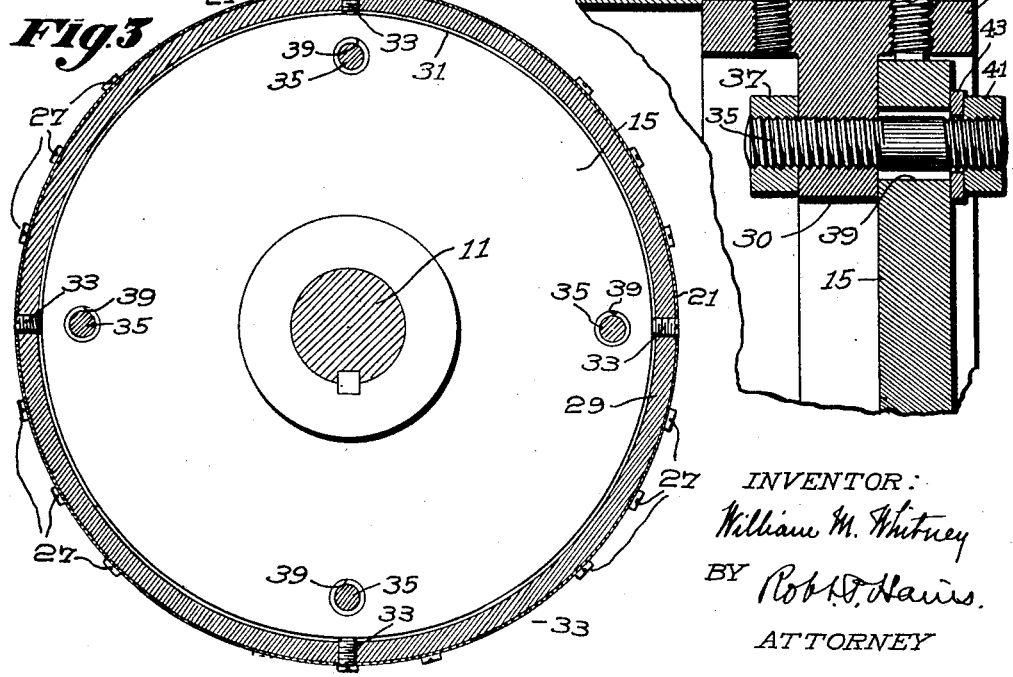

UNITED STATES PATENT OFFICE.

WILLIAM M. WHITNEY, OF WINCHENDON, MASSACHUSETTS, ASSIGNOR TO BAXTER D. WHITNEY & SON, INC., OF WINCHENDON, MASSACHUSETTS, A CORPORATION OF MASSACHUSETTS.

DRUM-SAW MACHINE.

1,386,082.   Specification of Letters Patent.   Patented Aug. 2, 1921.

Application filed October 27, 1920. Serial No. 419,819.

*To all whom it may concern:*

Be it known that I, WILLIAM M. WHITNEY, a citizen of the United States, residing at Winchendon, in the county of Worcester and State of Massachusetts, have invented an Improvement in Drum-Saw Machines, of which the following description, in connection with the accompanying drawings, is a specification, like characters on the drawings representing like parts.

The invention to be hereinafter described relates to drum saw machines for forming barrel staves or other work.

The drum saw comprises a body having attached thereto an end portion of high-grade steel with cutting teeth thereon. The user of the machine grinds or sharpens these teeth from time to time, and eventually the end portion becomes worn away so that it is necessary to return the saw to the maker thereof in order that a new end portion be substituted for the worn one. Heretofore, the construction has been such that the drum saw, its head and shaft, have been returned to the maker. These parts are of a heavy, bulky character, and expensive to ship to and from the maker. One of the purposes of the present invention, therefore, is to provide means readily detachable to connect the drum saw with the head on the shaft, in order that as small a part of the machine as possible will be shipped back to the maker.

To avoid substantial interruption in the use of the machine, it is desirable to ship a supply of the saws to the user or to an agent so near to the user that a new saw may be delivered to the user promptly, when required. After a sufficient number of worn saws have accumulated, they may be sent by freight back to the maker to have their end portions renewed. Thus, the saws may be transported with a minimum expense.

It is important that the drum saw should be accurately positioned and centered in respect to the driving shaft therefor, in order that the drum saw may not tremble or wabble in use. It is difficult to construct the parts so that they will have a fit which will insure accurate centering of the drum saw with respect to its shaft. The large size and other characteristics of the parts are such that reaming and grinding thereof are not commercially practicable, and even if the parts are formed originally for accurate fit, such relation is liable to be lost when the saws are exchanged and the parts are repeatedly connected as required in the course of the use thereof.

Another purpose of the invention, therefore, is to provide simple and efficient means for accurately centering the drum saw in respect to the driving shaft.

The character of the invention may be readily understood by reference to the following description of one good form thereof, shown in the accompanying drawings, wherein:—

Figure 1 is a perspective view of a drum saw machine embodying the invention;

Fig. 2 on an enlarged scale is a sectional view of the rear portion of the drum saw, the supporting shaft for the saw and means for detachably mounting the same, parts being shown in disassembled relation.

Fig. 3 is a transverse section taken on line 3—3 of Fig. 2; and

Fig. 4 on a still larger scale, is a section of features to be referred to.

Referring to the drawings, the machine may be provided with any appropriate support, in the present instance comprising end uprights 1 connected by a base member 3. Mounted on the uprights are bearings 5 and 7 provided with caps 9 detachably secured by bolts so that the caps may be removed to permit the drum saw shaft to be lifted therefrom, as more fully hereinafter described.

Journaled in bearings 5 and 7 is a horizontal shaft 11 having a pully 13 fast on one end thereof, and adapted to be driven by a belt from any suitable source of power.

Mounted on the shaft 11 is a head conveniently in the form of a disk 15 having a hub 17 mounted on a reduced portion of said shaft, and confined against axial movement in respect to said shaft between the bearing 5 and the shoulder 19 on the shaft.

A drum saw 21 may be provided of appropriate construction, preferably made from steel, and of sufficient thickness to give it the necessary stiffness and rigidity. This saw has a body portion 21ᵃ which should have a length at least equal to the length of the stave to be formed, and has an end portion 21$^b$ secured to the body provided with teeth 23 for performing the cutting operation. Mounted in the rear end of the drum saw is a member, in the present instance in the form of a ring or collar 29 secured to the drum saw by screws 27 located at appropriate intervals. This ring may have a flange 30 projecting inwardly therefrom provided with a face adapted to engage a face of the shaft head 15, referred to.

The diameter of the shaft head 15 may be somewhat smaller than the internal diameter of the ring or collar 29 so as to leave a space 31 (Figs. 3 and 4) between them. In other words, the construction of the ring and collar is such that they may be readily formed without accurate fit.

Suitable means may be provided for adjusting the drum saw and ring transversely with respect to the shaft, in order accurately to center the drum saw in respect to the axis of the shaft and prevent wabbling or trembling of the drum saw in use. This means, in the present instance of the invention, comprises a plurality of adjusting screws 33 which may be entered through bores in the drum saw larger than said screws, and tapped into the ring 29. The inner ends of said screws are adapted to engage and bear against the periphery of the shaft head 15. The construction is such that after the ring has been mounted on the head, the set screws may be adjusted to move the drum saw and ring transversely with respect to the axis of the shaft until the drum saw has been accurately centered in respect to said shaft.

Suitable means may be provided for securing the ring to the head after the drum saw has been centered in respect to the axis of the shaft. This means, in the present instance, comprises a plurality of bolts 35 which may have shanks threaded into the ring flange 30, said bolts being secured to said flange by nuts 37. These bolts may be entered through smooth bores 39 in the shaft head 15 registering with said bolts. After the bolts have been entered through the bores 39, the parts may be secured together by nuts 41, washers 43 being interposed between said nuts and the outer face of the head. In order that the bores 39 may not interfere with adjustment of the drum saw transversely to the shaft, said bores are made somewhat larger than the diameters of the shanks of the bolts. The construction is such that after the screws 33 have been given the adjustment properly to position the drum saw in respect to the shaft, the nuts 41 may be tightened, thereby to secure the ring flange 30 to the shaft head. While in the present illustration of the invention the bolts are threaded in the ring flange and entered through enlarged bores in the shaft head, it will be understood that they might be threaded into said head and entered through enlarged bores in the ring flange, and accomplish the purposes required.

The blocks or stock to be operated on by the saw may, in the production of barrel staves or other work, be carried by a carriage 45 having wheels 47 adapted to roll along tracks mounted on the supporting frame, said carriage being controlled by a suitable handle 49.

To contribute to proper position of the work as it is acted on by the saw, a gage 51 may be provided adapted to slide along a table 53 carried by brackets 55 mounted on one of the frame uprights. The gage 51 may be adjusted by means of a lever 57 pivotally connected to a boss 59 on the gage. The lower end of this lever is connected by a link 61 to a fulcrum 67 mounted at one end of the table 53. The upper end of the lever 57 is connected by a link 63 with a control device including a handle 65. Since the carriage and the gage are of usual construction, it is unnecessary to show and describe the same in detail herein. To protect the workman from the saw teeth, a guard 67 may be provided, curved to conform to the contour of the drum saw. This guard may have an arm 69 fulcrumed on a bolt 71 secured to one of the uprights, said arm being provided with a lug 73 adjustably secured to a shoulder on one of the uprights by a screw 75.

When the end portion of the drum saw has been worn away and it is necessary to return the same to the maker so that a new end portion may be substituted therefor, the saw may be quickly and easily detached from the head 15 by release of the nuts 41. This will allow the ring flange 30 to be adjusted axially of the shaft away from said head. The bearing caps 9 may be released, and then the shaft may be lifted from its bearings so as to allow the removal of the drum saw and its ring therefrom. Then a new saw or one having a renewed end portion may be substituted for the saw thus removed. To accomplish this, the new saw is inserted over the shaft, and given a proper rotative adjustment so as to bring the bolts 35 into registration with the bores 39 in the head 15. Then the nuts 41 may be set up, but not tightened. This will hold the ring in position so that its internal surface will rest on the head 15. Then the screws 33 may be adjusted so as to move the drum saw transversely in respect to the axis of the shaft until the drum saw is accurately centered in respect to said axis. The inner ends of the screws 33 will react against the periphery of the head in the course of this adjustment, and may hold the ring slightly spaced from the periphery of said head.

Then the nuts 41 may be further tightened firmly to secure the outer face of the ring flange against the inner face of the head.

The construction is such that it eliminates the necessity of broaching the internal diameter of the ring flange 30 and turning the periphery of the head to have an accurate fit. By providing the adjusting screws for centering the drum saw in respect to the shaft, the drum saws may be always mounted so as to be accurately centered in respect to said shaft, and thus they may be relied upon to rotate without eccentricity, trembling, or wabbling, such as would produce imperfect work.

It will be understood that the invention is not limited to the specific embodiment shown, and that various deviations may be made therefrom without departing from the spirit and scope of the appended claims.

What is claimed is:—

1. In a drum saw machine, the combination of a shaft, a head thereon, a drum saw having an internal collar larger than and adapted to receive said head, and adjusting screws threaded into said collar bearing against said head for adjusting the drum saw to center the same in respect to the axis of said shaft.

2. In a drum saw machine, the combination of a shaft, a drum saw, members connected to said shaft and drum saw respectively, and means to adjust one of said members relatively to the other to center the drum saw in respect to the axis of said shaft.

3. In a drum saw machine, the combination of a shaft, a head on said shaft, a drum saw having a collar with a face for engagement with a face of said head, means to adjust said collar transversely to the axis of said shaft to center the drum saw in respect to said shaft, and means to secure the head and collar faces together to maintain the drum saw in its position of adjustment.

4. In a drum saw machine, the combination of a shaft, a disk head fast on said shaft, a drum saw having a ring secured thereto provided with an internal flange, adjusting screws threaded into said ring and having inner ends for engagement with the periphery of the head disk, for adjusting the drum saw and its ring transversely to the axis of said shaft to center the drum saw in respect to said shaft, and bolts for securing the ring flange to the disk head after the drum saw has been centered.

5. In a drum saw machine, the combination of a head, a drum saw having a ring for receiving said head with a space between the ring and head, screws for adjusting the ring transversely to the axis of said head to center the drum saw in respect to said axis, and means detachably to secure the ring to the head.

6. In a drum saw machine, the combination of a drum saw, a shaft therefor, members on said drum saw and shaft respectively, screw means to adjust the drum saw member relatively to the shaft member to center the drum saw in respect to the shaft, and means detachably to secure said members in their relation of adjustment.

7. In a drum saw machine, the combination of a shaft, a drum saw, means to adjust the drum saw transversely to the axis of the shaft to center the drum saw in respect to said axis, and means to secure the drum saw and shaft in their relation of adjustment.

8. In a drum saw machine, the combination of a shaft having a head thereon, a drum saw having a ring thereon to receive said head, said head and ring being formed approximately to center the drum saw in respect to said shaft, and means relatively to adjust the head and ring accurately to center the drum saw in respect to the shaft.

9. In a drum saw machine, the combination of a shaft having a head thereon, a drum saw having a ring thereon to receive said head, adjusting screws threaded into said ring and having inner ends adapted to bear against the periphery of said head, said screws being adjustable to center the drum saw in respect to the axis of said shaft, bolts entered through said ring and head for securing the same together, said head having bores to receive the bolts larger than the diameters of the bolts to enable movement of the saw and ring by said adjusting screws in centering the saw in respect to said shaft.

10. In a drum saw machine, the combination of a shaft having a head thereon, a drum saw, said shaft and saw having members fast thereon respectively, adjusting screws threaded to the drum saw member and adapted to bear against the shaft member to center the drum saw in respect to the axis of said shaft, and bolts for securing said members together, one of said members having bores receiving the bolts larger than the diameters of the bolts to allow adjustment of the saw by said screws.

In testimony whereof, I have signed my name to this specification.

WILLIAM M. WHITNEY.